July 17, 1956     W. F. WESTENDORP ET AL     2,755,014
IONIC VACUUM PUMP DEVICE
Filed April 24, 1953
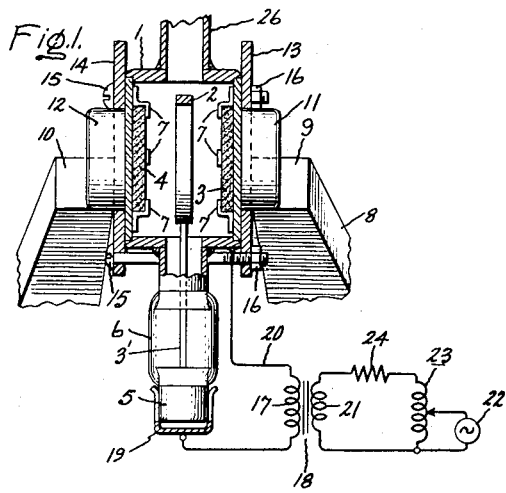
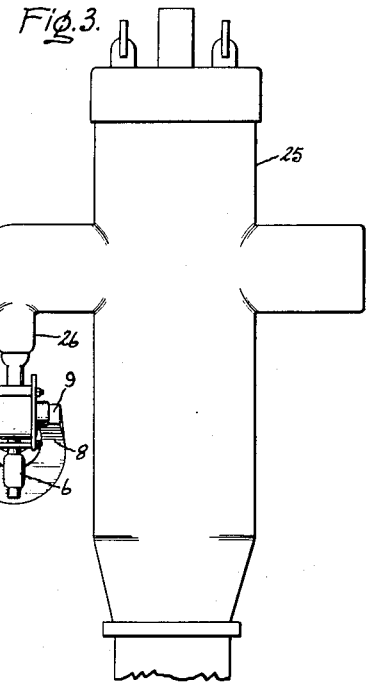
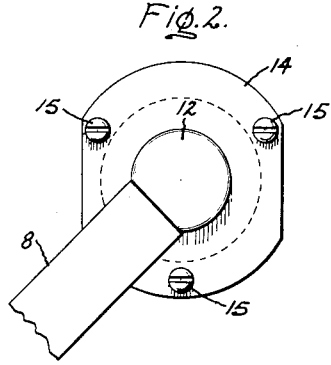
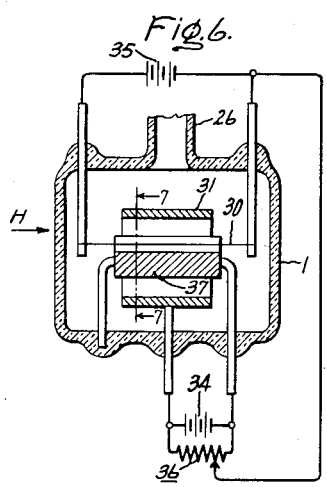
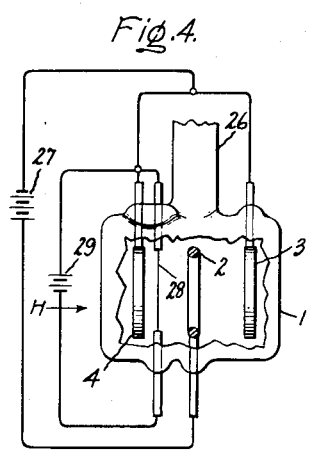
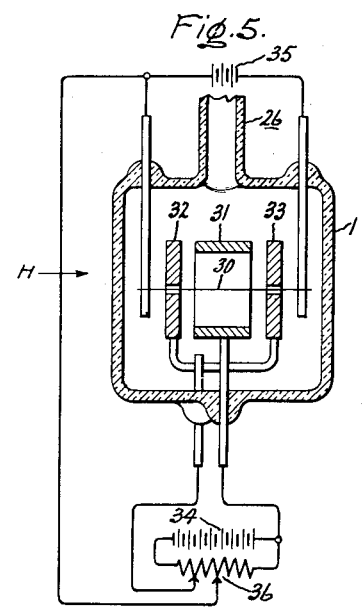
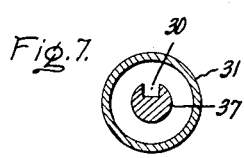
Inventors:
Willem F. Westendorp,
Anatole M. Gurewitsch,
by Paul A. Frank
Their Attorneys.

United States Patent Office 2,755,014
Patented July 17, 1956

2,755,014

IONIC VACUUM PUMP DEVICE

Willem F. Westendorp and Anatole M. Gurewitsch, Schenectady, N. Y., assignors to General Electric Company, a corporation of New York Application April 24, 1953, Serial No. 350,964

12 Claims. (Cl. 230—69)

This invention relates to vacuum pumps and, more particularly to a novel vacuum pump utilizing an ionic discharge.

In the production of high vacua the diffusion pump is the conventional means for obtaining the necessary exhaustion of gas. The diffusion pump, however, requires accessories such as fluid heaters and vapor condensation traps which make it expensive and cumbersome to install and operate. To maintain a vacuum within a sealed-off system after exhaust, chemically active getters are usually utilized; however, getters suffer from serious limitations as to the amount of gas that can be absorbed and as to their ineffectiveness with inert gases.

A principal object of the present invention is to provide a novel ionic pump which is capable of performing in an improved manner both the functions of producing high vacua and of maintaining high vacua in a sealed-off system.

According to the invention there is provided an ionic vacuum pump device which comprises an evacuable envelope defining a space adapted to contain gas molecules, means for ionizing the molecules including cathode and anode elements between which electrons are accelerated to ionize the molecules by bombardment, means for producing a magnetic field directed axially of the device to increase the length of path traveled by the electrons before collection by the anode whereby molecular ionization efficiency is enhanced, and means for driving the ionized molecules into a member of absorbent material positioned within the envelope transverse to the paths of the ionized and accelerated molecules, whereby the gas molecules are effectively removed from the space within the envelope.

The features of the invention desired to be protected herein are pointed out with particularity in the appended claims. The invention itself, together with further objects and advantages thereof, may best be understood by reference to the following description, taken in connection with the accompanying drawings, in which:

Fig. 1 is a partly sectionalized, perspective view of one modification of the ionic vacuum pump of the invention;

Fig. 2 is a view taken from one side of Fig. 1;

Fig. 3 is a perspective view showing the device of the invention attached in operative relationship to a high vacuum electron discharge device;

Fig. 4 is a simplified illustration of another modification of the ionic vacuum pump of the invention;

Fig. 5 is a simplified view of yet another modification of the device of the invention;

Fig. 6 is a simplified representation of still another modification of the ionic vacuum pump device of the invention; and Fig. 7 is a sectional view taken along line 7—7 of Fig. 6.

Referring particularly now to Figs. 1 and 2 there is shown one embodiment of the novel ionic vacuum pump device of the invention which comprises a cylindrical, evacuable envelope 1 constructed of a non-magnetic material such as stainless steel, a ring electrode 2 and disk or plate electrodes 3, 4. Ring electrode 2, which may be formed of molybdenum or tungsten, is supported approximately in the center of the space enclosed by envelope 1 by means of a conductive rod 3' which is attached to a conductive cup-shaped member 5 that is suspended from envelope 1 by an insulating tabulation 6. Electrodes 3 and 4, which may be formed from carbon, titanium, magnesium, aluminum or stainless steel as will be more fully explained hereinafter, can be attached to the respective end plates of envelope 1 by means of tabs 7 that are spot welded to the ends of envelope 1.

In order that a magnetic field may be produced and directed axially of the device, there is provided a high coercive force permanent magnet 8 which is positioned with its pole faces 9, 10 bearing respectively against soft iron pole pieces 11, 12. Pole pieces 11, 12 are maintained with their axes in alignment with the common axis of ring electrode 2 and plate electrodes 3, 4 by means of non-magnetic washer-shaped members 13, 14, bolts 15 and nuts 16. The apertures in members 13, 14 have diameters such that pole pieces 11, 12 respectively fit snugly therewithin, whereby nuts 16 can be tightened sufficiently to cause the pole pieces to bear against the exterior surfaces of the ends of envelope 1.

In order to energize the device the secondary winding 17 of a step-up transformer 18 is connected on one side to ring electrode 2 through a conductive cap 19 and on the other side of plate electrodes 3, 4 through a conductor 20 which may be attached to the exterior of the envelope 1 by any well-known means. The primary winding 21 of transformer 18 is supplied from a source of alternating current 22 through an autotransformer 23 and a current limiting resistor 24.

In operation the ionic vacuum pump device of the invention can be hermetically sealed through a tubulation 26 to an enclosure to be evacuated, such as the high vacuum electron discharge device 25 illustrated in Fig. 3. Since the ionic vacuum pump device operates to produce a high vacuum from a rough vacuum, it is presumed that the enclosure to be evacuated has been previously exhausted to at least a vacuum of the order of 10 or 100 microns by such means as a mechanical vacuum pump (not shown). When energizing potential is supplied between ring electrode 2 and plate electrode 3, 4, a cold-cathode electric gas discharge is initiated. Assuming that the voltage of source 22 is in the half cycle wherein ring electrode 2 is positive with respect to plate electrodes 3, 4, free electrons within the space enclosed by envelope 1 are accelerated toward the positive ring electrode or anode but are prevented from reaching this electrode directly by the axial magnetic field. The electrons can be considered as having spiral trajectories along the lines of force of the magnetic field. During the half cycle in which the ring electrode is positive the electrons perform numerous oscillations through the ring between the plate electrodes or cathodes 3, 4. In this manner the paths of the electrons are greatly extended, and thus the electrons are provided with the opportunity of undergoing numerous collisions with gas molecules to produce ions by bombardment before they are finally collected by the positive ring. Of course, each ionization process creates another electron which is then available for acceleration to produce additional ions. Since the gas ions possess a positive charge, they are accelerated toward the negative plate electrodes 3, 4 and are driven into them, whereby they are effectively removed from the space enclosed by envelope 1. During the process in which the gas ions are driven into the negative electrodes, secondary and photoelectrons also are produced and they likewise aid in sustaining the electric discharge. In the half cycle of the voltage of source 22 when the ring electrode is negative with respect to the plate electrodes, no gas discharge occurs. The gas discharge may be made continuous, however, by replacing the alternating current supply with a direct current source connected between the ring electrode and the plate electrodes with the polarity arranged to make the ring electrode positive.

It is of critical and essential importance to the successful operation of the device of the invention that the plate electrodes 3, 4 be formed of a material which is capable of absorbing substantial quantities of gas. If such is not the case, it is not possible to drive the ions into the material so as effectively to remove them from the enclosed space and produce the desired high vacuum. It has been found that very good results are obtained when electrodes 3, 4 are formed of carbon. Other materials which have proved to be satisfactory are titanium, aluminum, magnesium, and stainless steel, or combinations of these materials. Suitable degassing techniques for the various materials, which may be employed to increase gas absorption capacity, may be found described in the text by Saul Dushman entitled Scientific Foundations of Vacuum Technique, published in 1949 by John Wiley & Sons, Inc. In particular, carbon electrode disks may be degassed, after machining to the desired shape, by heating in air to a temperature ranging between about 800° and 1000° C. Following this the disks are immersed in distilled water for a short time, then removed and heated in a hydrogen furnace to about 1100° C. for approximately 10 minutes. Subsequently, the disks are placed in an evacuated enclosure and heated, for a substantial length of time such as several hours, at about 1000° C. in a radio frequency furnace to complete the out-gassing procedure.

The following considerations will lend clarity to the operational characteristics of the device of the invention. The relation between the pumping speed $dN/dt$ (where N is the total number of ions absorbed), the discharge current $i$, the voltage V and the magnetic field B can be assumed in the first approximation for a given gas to be:

$$dN/dt = Ki - \lambda N \quad (1)$$

where $i=f(V,p,B)$, $p$=pressure within envelope 1, $K=f(V)$, and $\lambda$ is a constant for constant temperature and is characteristic of the absorbed gas and the material of electrodes 3, 4. For constant V, $p$ and B, the solution to the differential equation 1 is:

$$N = K/\lambda \, (1-e^{-\lambda t})i, \quad (2)$$

and therefore:

$$dN/dt = Kie^{-\lambda t} \quad (3)$$

From these results one can qualitatively predict the behavior of the ionic vacuum pump of the invention as follows.

In a system that has a definite leak rate, L, a dynamic equilibrium will be established where the pumping speed $dN/dt$ just compensates the leak in the system. Therefore, we may write, $$dN/dt = L = Ki - \lambda N \quad (4)$$

Thus, $$Ki = L + \lambda N \quad (5)$$

Accordingly, if a lower pressure is desired, the discharge current must be increased. This can be done by increasing the voltage V, which in turn may necessitate a simultaneous increase in the strength of the magnetic field; because an increase of voltage beyond a certain limit without an accompanying increase in magnetic field causes electrons to be collected before they are able to produce a sufficient number of ions and results in a lowering of the efficiency of the pumping process. In a sealed-off system such as that illustrated in Fig. 3, the pressure is reduced steadily from the initial value until the pumping speed becomes very small. Thus, $$dN/dt \to 0 \quad (6)$$

and $$N \to Ki/\lambda \quad (7)$$

In some cases, the pressure may become too low to maintain the discharge under the prevailing conditions of voltage and magnetic field. The discharge may then become irregular or stop entirely, and the pressure will start to increase according to the relation $dN/dt = \lambda N$ until it becomes sufficient to restart the discharge. The cycle then repeats.

In order that an appreciation of the advantageous quantitative results which can be secured with the ionic vacuum pump device of the invention will be obtained, tables 1 and 2 (below) are included herein to set forth the results of two separate runs performed with the apparatus hereinbefore described. In the device as constructed the distance between electrodes 3, 4 was about three inches and the diameter of the electrodes was about one and one-half inches. The diameter of ring electrode 2 was comparable to the diameter of electrodes 3, 4. The ring electrode was formed from tungsten and the electrodes 3, 4 from carbon about one-sixteenth inch thickness. The device was connected through tubulation 26 to a closed volume of approximately 1300 cubic centimeters.

TABLE I

| | |
|---|---|
| Voltage from ring to disk electrodes | 5,000 volts, R. M. S. |
| Approximate magnetic field | 800 gauss. |
| Duration of operation | 15 minutes. |
| Initial pressure of helium | 10 microns. |
| Final pressure of helium | 0.006 microns. |

TABLE II

| | |
|---|---|
| Voltage from ring to disk electrodes | 10,000 volts, R. M. S. |
| Approximate magnetic field | 800 gauss. |
| Durations of operation | 15 minutes. |
| Initial pressure of helium | 0.1 microns. |
| Final pressure of helium | 0.0025 microns. |

Pressures as low as $5 \times 10^{-4}$ microns have been obtained with the ionic pump of the invention. If after long periods of operation it is found that plate electrodes 3, 4 have become saturated, the gas absorbed in the plates can be driven out by heating the device. The heat essentially increases the aforementioned coefficient $\lambda$. Higher speeds and capacities can be obtained by reducing the operating temperature of plate electrodes 3, 4; however, this introduces the additional complication of providing cooling means.

A modification of the ionic pump device of the invention, which operates in a manner similar to that of the preceding figures, is illustrated in simplified fashion in Fig. 4 therein reference characters utilized hereinbefore are employed to identify like elements. As will be observed, ring electrode 2 and plate electrodes 3, 4 are supported within envelope 1 which is here shown as constructed from a vitreous material. Ring electrode 2 is maintained at a positive potential with respect to plate electrodes 3, 4 by means of a source of direct current potential 27. An additional supply of electrons is provided by a thermionically emissive cathode 28 supported within envelope 1 and energized by a source of direct current voltage 29. Before cathode 28 is energized, the space enclosed by envelope 1 should be sufficiently evacuated to prevent destruction or poisoning of cathode 28 by oxidation.

In the embodiment illustrated in Fig. 5 the ionizing electrons are formed into a rotating space charge in order to increase the length of paths traveled before their collection. Within the evacuable envelope 1, which is similar to that illustrated in Fig. 4, there are supported a thermionically emissive cathode 30, a hollow cylindrical anode 31 and plate electrodes 32, 33. It will be observed that each of the electrodes 32, 33 is positioned adjacent to one end of anode 31. Anode 31 is maintained at a positive potential with respect to electrodes 32, 33 by means of a source of direct voltage 34 and cathode 30 is energized by a source of direct voltage 35. The potential of cathode 30 with respect to anode 31 and electrodes 32, 33 can be adjustably maintained by means of a potentiometer 36 connected across direct current voltage source 34. If the anode voltage and the strength of the magnetic field, which is directed axially as indicated by the arrow H, are properly selected, electrons emitted from cathode 30 will build up into a revolving space charge in which the individual electrons move with substantial velocities, e. g., one-tenth of that of light. This mode of operation can be compared to that of a cylindrical anode magnetron operating near "cut-off" voltage. In this manner the electrons are caused to travel extended distances before perturbation by collisions with gas atoms permit them to reach anode 31. Accordingly, each electron is capable of producing a number of ionized molecules before its disappearance. The positive gas ions are accelerated toward the negatively charged electrodes 32, 33 and are driven into these electrodes to remove the ions effectively from the space enclosed by envelope 1. It is, of course, presumed that electrodes 32, 33 are formed from gas absorbent material in a manner similar to electrodes 3, 4.

In Figs. 6 and 7 wherein reference characters utilized hereinbefore are employed to identify like elements, there is shown a modification of the invention in which a rotating space charge is provided for gas ionization in a manner resembling that described in connection with the embodiment of Fig. 5. In this alternative construction gas absorbent electrodes 32, 33 of Fig. 5 are eliminated and essentially replaced by an axially disposed, gas absorbent cylindrical member 37. Thermionically emissive cathode 30 is supported within a groove in cylindrical member 37 as shown. The ionized gas molecules produced by the rotating space charge between cylindrical member 37 and anode 31 are accelerated toward member 37 and driven into it. This process effectively removes the gas molecules from the space enclosed by envelope 1 and hence produces the vacuum desired.

While the invention has been described by reference to particular embodiments thereof, it will be understood that numerous changes can be made by those skilled in the art without actually departing from the invention. For example, it is apparent that the permanent magnet utilized with all the embodiments of the invention can be replaced by an electromagnet. We, therefore, aim in the appended claims to cover all such equivalent variations as come within the true spirit and scope of the foregoing disclosure.

What we claim as new and desire to secure by Letters Patent of the United States is:

1. An ionic vacuum pump device comprising an evacuable envelope defining a space adapted to contain gas molecules, means coupled to said envelope for ionizing said molecules including cathode and anode elements between which electrons are accelerated to ionize said molecules by bombardment, means producing a magnetic field directed axially of said device to increase the length of path traveled by said electrons before collection by said anode element whereby molecular ionization efficiency is enhanced, a member of absorbent material positioned within said envelope transverse to the paths of said ionized and accelerated molecules, and means driving the ionized molecules into said absorbent member whereby said gas molecules are effectively removed from said space.

2. An ionic vacuum pump device comprising an evacuable envelope defining a space adapted to contain gas molecules, means coupled to said envelope for ionizing said molecules including cathode and anode elements between which electrons are accelerated to ionize said molecules by bombardment, means producing a magnetic field directed axially of said device to increase the length of path traveled by said electrons before collection by said anode element whereby molecular ionization efficiency is enhanced, means accelerating said ionized molecules to a relatively high energy, and a member of absorbent material positioned within said envelope in the path of said ionized and accelerated molecules, whereby said ionized molecules are driven into said member and absorbed to effectively remove said gas molecules from said space.

3. An ionic vacuum pump device comprising an evacuable envelope defining a space adapted to contain gas molecules, means coupled to said envelope for ionizing said molecules including cathode and anode elements between which electrons are accelerated to ionize said molecules by bombardment, means producing a magnetic field directed axially of said device to increase the length of path traveled by said electrons before collection by said anode element whereby molecular ionization efficiency is enhanced, means accelerating said ionized molecules to a relatively high energy, and a member of absorbent material selected from the class consisting of carbon, titanium, magnesium, aluminum, and stainless steel, said member of absorbent material being supported within said envelope transverse to the path of said ionized and accelerated molecules, whereby said ionized molecules are driven into said member and absorbed to effectively remove said gas molecules from said space.

4. An ionic vacuum pump device comprising an evacuable envelope defining a space adapted to contain gas molecules, means for ionizing said molecules including a pair of cathode elements supported in spaced apart relationship along a common axis within said envelope and a ring-shaped anode element positioned between said cathode elements in axial alignment therewith, said cathode elements being formed from gas molecule absorbent material, means for producing a magnetic field directed along the common axis of said cathode and anode elements whereby electrons repetitively accelerated between said cathode and anode elements travel greatly extended distances to produce enhanced ionization before collection by said anode element, and means accelerating said ionized molecules to a relatively high energy to drive said ionized molecules into said absorbent material of said cathode elements and effectively remove said gas molecules from said space.

5. An ionic vacuum pump comprising an evacuable envelope defining a space adapted to contain gas molecules, means for ionizing said molecules including a pair of cathode elements supported in spaced apart relationship along a common axis within said envelope and a ring-shaped anode element positioned between said cathode elements in axial alignment therewith, said cathode elements being formed from gas molecule absorbent material selected from the class consisting of carbon, magnesium, titanium, aluminum and stainless steel, means for producing a magnetic field directed along the axis of said cathode and anode elements whereby electrons repetitively accelerated between said cathode and anode elements travel greatly extended distances to produce enhanced ionization before collection by said anode element, and means accelerating said ionized molecules to a relatively high energy to drive said ionized molecules into said absorbent material of said cathode elements and effectively remove said gas molecules from said space.

6. An ionic vacuum pump device comprising an evacuable envelope defining a space adapted to contain gas molecules, means for ionizing said molecules including a pair of cold cathode elements supported in spaced apart relationship along a common axis within said envelope, a ring-shaped anode element positioned between said cold cathode elements in axial alignment therewith and a thermionically emissive element supported in the space between said ring-shaped anode element and one of said cold cathode elements, said cold cathode elements being formed from gas molecule absorbent material, means for producing a magnetic field directed along the common axis of said cathode and said anode elements whereby electrons repetitively accelerated between said cathode and anode elements travel greatly extended distances to produce enhanced ionization before collection by said anode element, and means accelerating said ionized molecules to a relatively high energy to drive said ionized molecules into said absorbent material of said cathode elements and effectively remove said gas molecules from said space.

7. An ionic vacuum pump device as in claim 6 in which said cold cathode elements are formed from gas molecule absorbent material selected from the class consisting of carbon, magnesium, titanium, aluminum and stainless steel.

8. An ionic vacuum pump device comprising an evacuable envelope defining a space adapted to contain gas molecules, means supported within said envelope for ionizing said molecules by electron bombardment including a hollow cylindrical anode structure and a thermionically emissive cathode extending longitudinally within the bore of said anode structure, means for directing a magnetic field along the axis of said anode structure whereby a rotating space charge may be generated between said cathode and said anode structure to enhance ionization of said molecules, means accelerating said ionized molecules to a relatively high energy, and gas molecule absorbent means interposed within said enevlope in the path of said accelerated and ionized molecules, whereby said ionized molecules may be driven into said absorbent means and effectively removed from said space.

9. An ionic vacuum pump device comprising an evacuable envelope defining a space adapted to contain gas molecules, means supported within said envelope for ionizing said molecules by electron bombardment including a hollow cylindrical anode structure and a thermionically emissive cathode extending along the axis of said anode structure, means for directing a magnetic field along the axis of said anode structure whereby a rotating space charge may be developed between said cathode and said anode structure to enhance ionization of said molecules, gas molecule absorbent means including a pair of plates each one of which is supported within said envelope adjacent one end of said anode structure, and means maintaining said plates at a negative potential with respect to said anode structure whereby said ionized gas molecules may be driven into said plates and effectively removed from said space.

10. An ionic vacuum pump device as in claim 9 in which said plates are formed of material selected from the class consisting of carbon, magnesium, titanium, aluminum and stainless steel.

11. An ionic vacuum pump device comprising an evacuable envelope defining a space adapted to contain gas molecules, means supported within said envelope for ionizing said molecules by electron bombardment including a hollow cylindrical anode structure, a substantially cylindrical electrode structure having a diameter smaller than said anode structure and being supported within the bore of said anode structure in axial alignment therewith, and a thermionically emissive cathode supported within a longitudinally extending groove in said electrode structure, means for producing a magnetic field directed along the axis of said electrode structure, means maintaining said anode structure at a positive potential with respect to said cathode, whereby a rotating space charge is developed between said cathode and said anode structure to enhance ionization of said molecules, and means maintaining said electrode structure at a negative potential with respect to said anode structure and said cathode, whereby said ionized molecules are accelerated and driven into the surface of said electrode structure to remove them effectively from said space.

12. An ionic vacuum pump device as in claim 11 in which said electrode structure is formed of material selected from the class consisting of carbon, magnesium, titanium, aluminum and stainless steel.

References Cited in the file of this patent

UNITED STATES PATENTS

| | | |
|---|---|---|
| 2,636,664 | Hertzler | Apr. 28, 1953 |